United States Patent

Snyder et al.

[15] 3,674,021
[45] July 4, 1972

[54] PLASTIC BANDAGE OR SPLINT

[72] Inventors: Harold I. Snyder, R.R. #3, P.O. Box 489, Dover, Ohio 44622; Richard R. Trexler, 9509 Lawndale Ave., Evanston, Ill. 60203

[22] Filed: Dec. 28, 1970

[21] Appl. No.: 101,493

[52] U.S. Cl. ............................................................128/90
[51] Int. Cl. .............................................................A61f 5/04
[58] Field of Search ..........................128/90, 89, 87; 206/47

[56] References Cited

UNITED STATES PATENTS

| | | | |
|---|---|---|---|
| 3,373,741 | 3/1968 | Hill et al. | 128/90 |
| 2,292,531 | 8/1942 | Lovell | 128/90 |
| 2,218,844 | 10/1940 | Lovell | 128/90 |
| 2,982,396 | 5/1961 | Shihadeh | 206/47 |
| 2,864,492 | 12/1958 | Lappala | 206/47 |

Primary Examiner—Charles F. Rosenbaum
Assistant Examiner—J. Yasko
Attorney—Olson, Trexler, Wolters & Bushnell

[57] ABSTRACT

The disclosed structure comprises an elongated bandage of the wrap-around type. The bandage is composed of a plurality of superposed strips of cloth or the like, one of which carries plastic resin and another of which carries a hardener or catalyst. A barrier sheet is interposed between the strips to keep the resin and hardener separated, the barrier sheet being arranged to provide a multiplicity of openings over its surface upon manipulation of the package, whereby to bring the resin and hardener into contact uniformly over the surface of the bandage. Upon application of the bandage to a body part of the like, and upon setting of the resin, a rigid plastic bandage or splint is provided.

10 Claims, 17 Drawing Figures

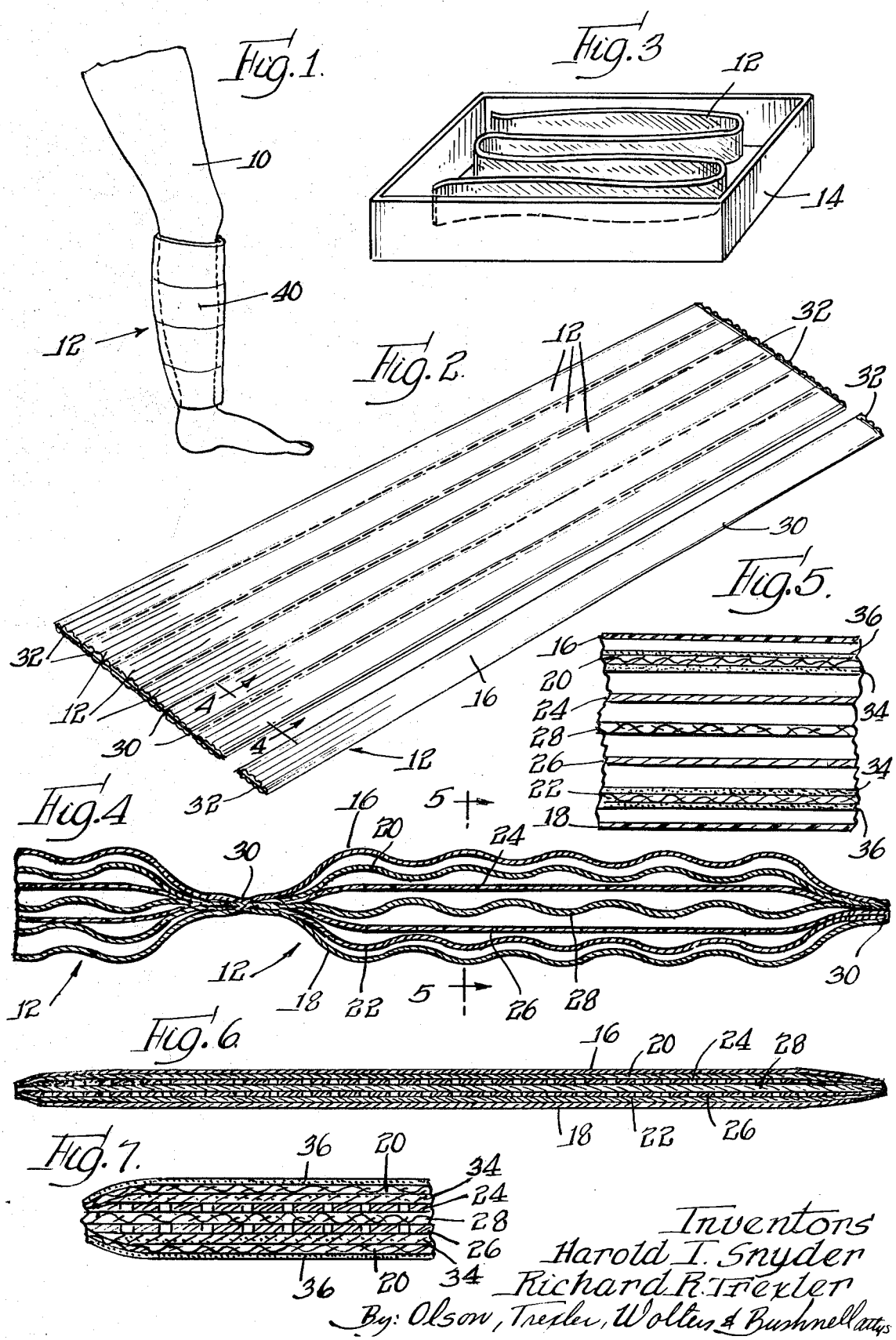

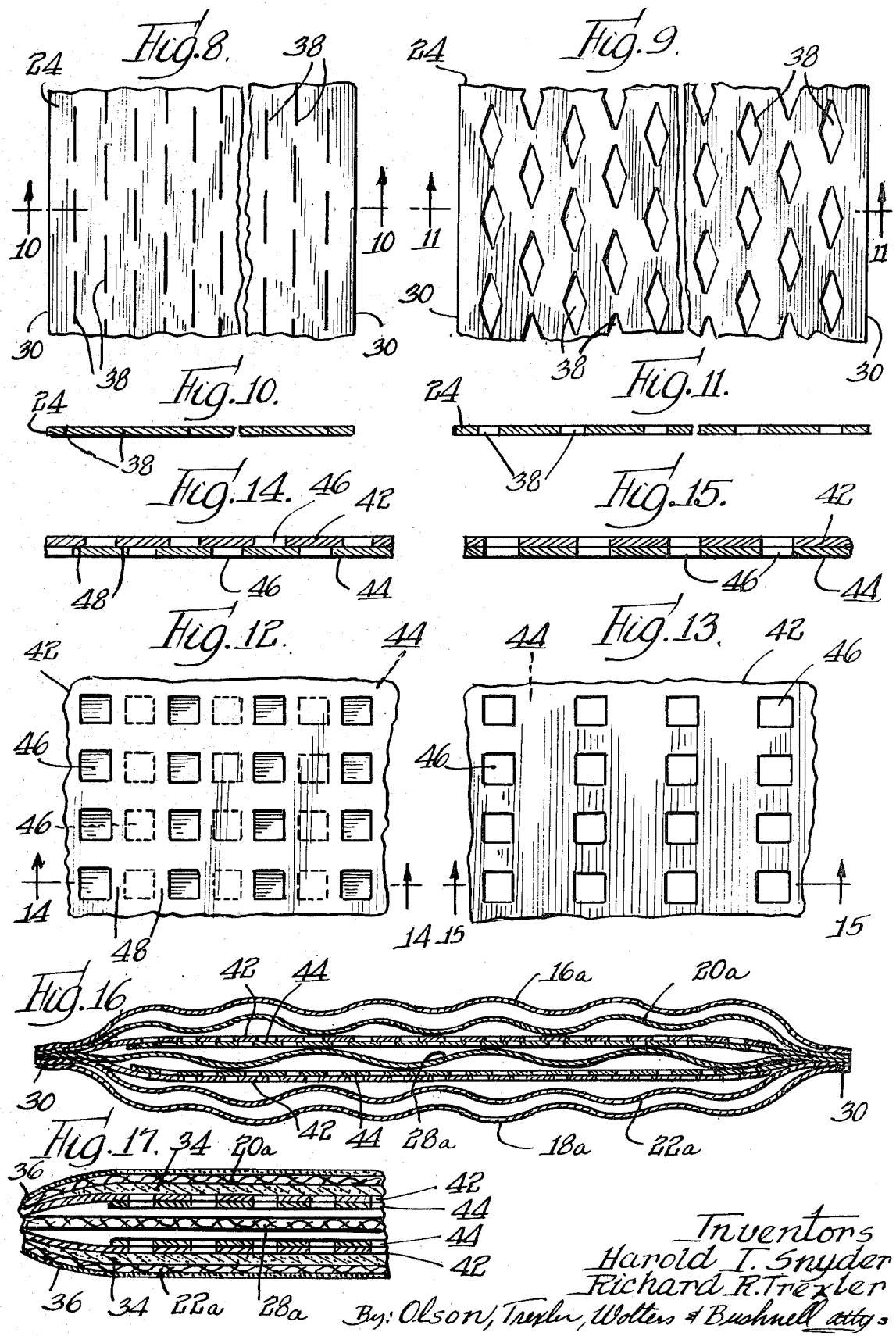

PLASTIC BANDAGE OR SPLINT

This invention relates to bandages and splints, and concerns particularly a bandage utilizing plastic, which upon manipulation, and application to a body part, and upon setting of the plastic, will provide a firm and rigid bandage and splint to the body part to which it is applied.

Plastic bandages and splints have been heretofore provided, a principal advantage of such structures being that upon setting of the plastic material a firm and rigid structure is provided, much stronger in relation to its weight, than bandages and splints formed of more conventional materials such as plaster or the like.

However, difficulties have been encountered in the fabrication and application of bandages utilizing plastic material. One problem has been the formation of excess heat, with its resulting dangers. An even greater problem has been the difficulty in effecting a uniform intermingling of the plastic resin and the hardener or catalyst uniformly over the surface of the bandage.

In accordance with the present invention a bandage is provided, utilizing plastic resin, incorporating means for effecting a uniform intermingling of the resin and the hardener or catalyst, over the entire surface of the bandage, by a manipulation of the bandage structure, which may be readily effected prior to the application of the bandage to the body part. Such uniform intermingling of the resin and hardener, over the entire bandage surface, eliminates the formation of "hot spots" upon the bandage surface; and also effects a uniform distribution of the chemical reaction between the resin and the hardener, over the surface of the bandage, whereby to provide a uniformly reactive, while at the same time a readily manipulatable bandage structure.

It is accordingly an object of the present invention to provide a bandage, using plastic material, which upon manipulation, will provide a more uniform intermingling of the plastic resin and the hardener or catalyst over the bandage surface.

A further object of the invention is to provide a bandage, of the type defined, which minimizes the formation of "hot spots" in the reaction of the plastic material.

A further object of the invention is to provide a bandage of the type defined, utilizing plastic resin, wherein the polymerization of the plastic material may be effected in a more uniform and controlled manner.

A further object of the invention is to provide a bandage of the type defined, utilizing plastic material, and incorporating the advantages and features set forth, which may be readily fabricated; and also easily manipulated, to effect the polymerization of the plastic material.

Another object of the invention is to provide, in a structure as above set forth, means for controlling the degree of polymerization of the plastic resin, to effect a varying of the strength of the completed bandage, and means to control the breathing or air permeability thereof.

Various other features and advantages of the invention will be apparent from the following specification, taken in connection with the accompanying drawings, wherein certain preferred embodiments of the invention are set forth for purposes of illustration.

In the drawings, wherein like reference numerals refer to like parts throughout, FIG. 1 is a perspective view of a body part, a human leg in the instance illustrated, to which the plastic bandage or splint of the present invention may be applied;

FIG. 2 is a perspective view showing a multiplicity of bandages of the present invention, after formation, and before separation into individual bandage units, one bandage unit being shown in separated position;

FIG. 3 illustrates a container or box, with a bandage unit therein, for example as marketed;

FIG. 4 is a transverse section on an enlarged scale more particularly showing one of the bandage units;

FIG. 5 is a partial detail view, in longitudinal section and upon a further enlarged scale, of the bandage unit shown in FIG. 4, taken as indicated by the line 5—5 thereof;

FIG. 6 is a transverse sectional view, similar to FIG. 4, but showing the bandage in manipulated position;

FIG. 7 is a partial view of the structure of FIG. 6, upon an enlarged scale, and with the plastic covering removed;

FIGS. 8 and 9 are detail views, more particularly illustrating the action of the barrier sheet, in the bandage structure of FIG. 4;

FIGS. 10 and 11 are sectional views of the barrier sheet of FIGS. 8 and 9, on the lines 10—10 and 11—11 respectively;

FIGS. 12 and 13 are views similar to FIGS. 8 and 9, but illustrating a modified form of barrier sheet structure;

FIGS. 14 and 15 are sectional views of the barrier sheet structure of FIGS. 12 and 13 taken on the lines 14—14 and 15—15 respectively;

FIG. 16 is a view, similar to FIG. 4, but incorporating the barrier sheet structure of FIGS. 12—15, and FIG. 17 is a partial detail view of the structure of FIG. 16, after manipulation and with the plastic sheet removed.

Referring more particularly to the drawings, and first to the embodiment of the invention illustrated in FIGS. 1-11, in FIG. 1 there is illustrated a body part, in this instance a human leg 10, to which the bandage or splint structure of the present invention, generally indicated by the reference numeral 12, is applied. As will be seen, the bandage unit is adapted to be wrapped in spiral fashion about the leg whereby to form a rigid plastic bandage or splint, as will be hereinafter described.

FIG. 2 illustrates the manner in which the bandage units of the present invention may be fabricated in multiple form, and then severed to provide the individual bandage unit structures. In FIG. 2 a multiplicity of interconnected bandage units 12 are shown, from which one unit has been severed and separated.

FIG. 3 illustrates a separated bandage unit 12 in coiled position and disposed within a container 14, ready for marketing to a doctor or user. The structure of the bandage is more particularly illustrated in FIG. 4, which is a transverse sectional view through the bandage structure. More particularly, each bandage comprises a pair of outer enclosing plastic sheets 16 and 18; a pair of cloth strips 20 and 22 carrying plastic resin and adhesive, as will be presently described; a pair of barrier sheets 24 and 26; and a central cloth strip as indicated at 28, impregnated with a hardener or catalyst for the plastic resin. As previously indicated, the bandage units may be fabricated in multiple, for economy, one complete unit and a portion of an adjacent unit, being depicted in FIG. 4. In fabricating the units, the several sheets or laminae may be brought together and adhesively secured, as indicated at 30, FIG. 4, so that upon severance at the adhesively secured connection, a plurality of bandage units hermetically sealed along their longitudinal edges will be provided. Upon severance of the bandage units into appropriate lengths, the ends 32, FIG. 2, thereof may be dipped into wax, or other sealing media, whereby to provide individual bandage units which are hermetically sealed both longitudinally and at the ends, whereby to provide peripherally hermetically sealed unit structures. The fabricating operations may be conducted within an inert gas atmosphere, such for example as nitrogen, whereby an inert gas will be entrapped within the units, thus providing a maximum shelf life for the plastic resin. Entrapped gas, whether it be an inert gas or air, will also preferably maintain the bandage lamina in spaced or separated relation, indicated upon an exaggerated scale in FIG. 4.

Referring further to FIG. 4, it will be seen that when the bandage unit is in normal stored condition, prior to manipulation and use by the doctor or other user, the encompassing plastic cover sheets 16 and 18, and the resin impregnated cloth strips 20 and 22, and the centrally disposed hardener impregnated cloth strip 28 are in undulated disposition; whereas the barrier sheets 24 and 26 are flat or taut, thereby determining the width of the bandage unit in its normal non-manipulated position. Upon a lateral separation of the longitudinal bandage edges 30, by manual manipulation, the bandage unit will be manually extended or widened, to the position indicated in FIG. 6, whereupon the barrier sheets or strips 24 and 26 are manipulated in a manner to permit a uniform intermingling of the plastic resin carried by the cloth strips 20 and 22, and the hardener or catalyst carried by the cloth strip 28, in a manner presently to be described.

Before discussing the detailed action of the barrier sheets, reference is made to FIG. 5, wherein the several lamina or layers which make up the bandage structure, are shown in separation and in further enlarged scale.

Referring to FIG. 5, the external plastic sheets 16 and 18 may be any suitable relatively impervious plastic sheeting material, these plastic covers serving as an impervious casing for the bandage during storage, and as a cover during manipulation; and these plastic covers are preferably removed, as shown in FIG. 7, just prior to the time that the bandage is wrapped upon the body part in use.

The strips 20 and 22, which may be any suitable clothlike material, preferably are impregnated upon their inwardly facing surfaces with the plastic resin, as indicated at 34, and impregnated or coated upon their outwardly facing surfaces with a pressure sensitive or tacky adhesive, as indicated at 36. As will be understood, as the bandage is wrapped, for example in spiral fashion about a body part, the tacky adhesive surfaces 36 will be brought into contacting superposing relation, whereby to impart an initial strength and partial rigidity to the bandage during and prior to the setting or polymerization of the plastic resin.

As further shown in FIG. 5, the barrier sheets 24 and 26 provide a barrier means between the plastic resin and the central impregnated cloth strip 28 which carries the hardener or catalyst material.

The action and manner of functioning of the barrier strips is best shown in FIGS. 8–11, wherein one of the barrier sheets or strips, for example the sheet 24, is shown in greater detail. It will be seen that the strip is provided with slits or the like 38, in alternate staggered relationship, these slits normally being closed, as shown in FIG. 8, to provide an effective impervious barrier between the plastic resin and the hardener. Preferably the barrier sheets 24 and 26, which may be fabricated for example of paper or plastic, are dipped into wax or the like so as to provide an impervious barrier means between the plastic resin and the hardener material, to insure a long shelf life for the product.

As is illustrated in FIGS. 9 and 11, when the edges of the barrier strips are laterally separated, by manual force, from the position of FIG. 4 to the position of FIG. 6, the slits 38 will be opened up, in the manner of the action of expanded metal lath, and as is shown in FIGS. 9 and 11, whereby to provide a multiplicity of perforations or openings through the barrier sheets, so as to bring the plastic resin 34 and the hardener carried by the cloth strip 28 into contact, so as to initiate the polymerization or setting of the plastic resin material. It will be seen that the arrangement and spacing of the slits 38 will determine the number and spacing of the openings through the barrier sheet upon manual manipulation of the bandage. If a relatively large number of slits in closely spaced relation are provided, a more rigid plastic bandage or splint will result upon the setting of the plastic resin material, as compared with an arrangement wherein the slits 38 may be fewer in number, and more widely spaced, whereby to provide a bandage or splint of less strength, but of greater "breathing" capabilities. It will be seen that the openings 38, thus provided, in effect act like a plurality of spot welds as the plastic resin material is brought into activation at a multiplicity of spaced points. If the slits are closely spaced, a substantially continuous welding or polymerization of the plastic resin will result to provide a plastic splint or bandage of maximum strength. As will be understood, the undulated disposition of the cover plastic sheeting 16 and 18, and the cloth strips 20, 22 and 28, permits the described separation of the openings 38 in the barrier sheets, as the longitudinal edges of the bandage are laterally separated from the position of FIG. 4 to the position of FIG. 6, by manual manipulation of the bandage structure.

In FIG. 7 the bandage is shown in condition to be wrapped about a body part, so as to provide a bandage or splint therefor, the several laminae of the bandage structure having been brought into contacting relationship, and the outer plastic sheets 16 and 18 having been removed. During manipulation, the plastic resin material and the hardener are brought into contact through the openings 38 in the barrier strip, as previously described. Also during manipulation, the wax seals at the ends 32 of the bandage will be ruptured, thus permitting the several lamina of the bandage structure to be brought into superposed contacting relationship, as indicated in FIGS. 6 and 7. Whether the slits or openings in the barrier sheets are closely or widely spaced, it will be seen that the plastic resin will be activated by the hardener or catalyst, uniformly over the entire bandage surface. Uniformity is thus effected by a simple manipulation of the bandage structure, and "hot spots" in the setting of the plastic resin are avoided. Depending upon the nature of the plastic used, the doctor or other user may permit a predetermined time interval to elapse between manipulation of the bandage, to initiate the polymerization of the plastic resin, and the wrapping of the bandage structure about the body part. A predetermined amount of heat may thus be dissipated prior to the application and use of the bandage about the body member.

As will be understood, the use of the tacky adhesive 36 is optional, and when used, a suitable cloth strip or sleeve may be wrapped about the completed bandage, such encompassing sleeve or strip being indicated by the numeral 40 in FIG. 1.

As previously mentioned, the pattern of polymerization of the plastic resin may be controlled by the arrangement and spacings of the openings in the barrier sheet. As will be understood, the degree of polymerization may also be controlled, or varied within limits, by the amount of manipulation imparted to the bandage by the doctor or user prior to the application of the bandage to the body part, viz., a greater degree of manipulation will effect a greater intermingling of the plastic resin and the hardener so as to maximize the polymerization of the plastic resin layer.

In FIGS. 12–17 an alternate form of barrier sheet is employed. Referring to FIGS. 12 and 14, it will be seen that the barrier sheet in this instance is composed of two parts or layers 42 and 44, each of which is provided with perforations 46, and the perforations being offset when the layers are in normal position, as shown in FIGS. 12 and 14. The size of the openings 46 is such that there is a degree of overlap, as indicated at 48, when the layers are in normal position; and to insure that the barrier sheet will form an hermetic seal between the plastic resin and the hardener, for a long shelf life of the bandage. The sheet layers 42 and 44 may be dipped in wax prior to being superimposed whereby the composite sheet, formed of the two layers, will provide an impervious barrier, prior to manipulation of the bandage structure. More particularly, the wax dip will insure than an impervious seal is formed between the sheet layers along the contacting areas 48.

As shown in FIGS. 13 and 15, when the two layers 42 and 44 are shifted laterally in respect to each other, the openings will be brought into alignment, thus functioning in a manner similar to the openings 38 in the barrier sheet previously described.

To effect a proper magnitude of shifting of the layers to bring the openings 46 into alignment, as the bandage is manipulated, it will be seen by reference to FIG. 16 that one of the barrier sheet layers, for example the layer 42, is secured to one longitudinal side seam of the bandage, whereas the layer 44 is secured to the opposite longitudinal side seam. By this means when the bandage structure has been laterally extended to its full length determined by the amount of undulation or fullness in the plastic cover sheets 16a and 18a, and in the cloth webs 20a, 22a and 28a, a degree of movement will be imparted to the barrier sheet layers 42 and 44 sufficient but not excessive, to bring the openings 46 into alignment. Such aligned position is shown in FIG. 17, which corresponds to FIG. 7 in the embodiment previously described, and wherein the outer plastic encasement 16a and 18a has been removed.

In the operation and use of the bandage structure, the doctor or user removes the bandage from its container, and by manipulation of the bandage ruptures the wax end seals 32; and by effecting a lateral separation of the longitudinal side edges of the bandage the openings previously described are formed in the barrier sheets between the plastic resin and the hardener, and the various laminae of the bandage are brought into contact, whereby to effect an intermingling of the plastic resin and the hardener. A continued kneading or manipulation of the bandage will further intermingle the plastic resin and the hardener, so as to effect the activation and polymerization of the plastic resin in a controlled manner. The pattern of the openings in the barrier sheet insures a uniformity and ready mixing of the plastic resin and hardener materials. After a predetermined delay, to dissipate any excess heat, and as the resin is beginning to set, the plastic encasement may be removed and the bandage applied to the body part to be bandaged or reinforced.

The invention is hereby claimed as follows:

1. A plastic bandage comprising a plurality of superposed lamina, one of said lamina carrying plastic resin and another of said lamina carrying a hardener for the resin, and a flexible barrier sheet interposed between said lamina to maintain a separation and provide an impervious barrier between the resin and the hardener, said flexible barrier sheet having openings in a predetermined pattern which are normally closed, said flexible barrier sheet being operable by manipulation of the bandage to effect the opening of said normally closed openings to permit an intermingling of the resin and hardener to effect the setting of the plastic resin.

2. A plastic bandage as defined in claim 1, wherein there is further provided a plastic envelope for the bandage to provide an hermetically sealed unit.

3. A plastic bandage as defined in claim 2, wherein said encompassing plastic envelope may be removed from the bandage without disturbing the remaining lamina of the unit.

4. A plastic bandage as defined in claim 1, wherein the barrier sheet is operable by a stretching applied to the marginal edges of the bandage effected by bandage manipulation.

5. A plastic bandage as defined in claim 1, wherein the superposed lamina are disposed within an inert gas to enhance the shelf life of the structure.

6. A plastic bandage as defined in claim 1, wherein a plurality of plastic resin carrying lamina is provided.

7. A plastic bandage as defined in claim 1, wherein a plurality of plastic resin carrying lamina is provided, and the lamina carrying the hardener is disposed therebetween.

8. A plastic bandage as defined in claim 1, wherein there is provided a plurality of lamina carrying plastic resin, and wherein there is provided a plurality of barrier sheets, one for each resin carrying lamina.

9. A plastic bandage as defined in claim 1, wherein the outermost lamina is coated on its outer face with an adhesive adapted to be brought into superposed contact upon spiral wrapping of the bandage to enhance the strength and rigidity of the bandage when in spiral wrapped position upon a body part.

10. The method of making a rigid plastic bandage which comprises superposing a plurality of lamina to form a bandage structure, impregnating one lamina with a plastic resin uniformly over its surface, impregnating an adjacent lamina with a hardener uniformly over its surface, disposing a barrier sheet between said lamina to maintain the plastic resin and hardener separate, and perforating the barrier sheet in a predetermined pattern thus effecting an intermingling of the plastic resin and hardener over the surfaces of said lamina in accordance with said predetermined pattern.

* * * * *